(12) United States Patent
Campbell et al.

(10) Patent No.: US 8,371,015 B2
(45) Date of Patent: Feb. 12, 2013

(54) METHOD OF TERMINATING A STRANDED SYNTHETIC FILAMENT CABLE

(75) Inventors: Richard V. Campbell, Tallahassee, FL (US); David E. Sediles, Tallahassee, FL (US); David W. Hilbig, Cairo, GA (US); Kristopher L. Wortham, Tallahassee, FL (US)

(73) Assignee: Bright Technologies, LLC, Havana, FL (US)

( * ) Notice: Subject to any disclaimer, the term of this patent is extended or adjusted under 35 U.S.C. 154(b) by 299 days.

(21) Appl. No.: 12/889,981

(22) Filed: Sep. 24, 2010

(65) Prior Publication Data

US 2011/0067220 A1    Mar. 24, 2011

Related U.S. Application Data

(60) Provisional application No. 61/277,385, filed on Sep. 24, 2009.

(51) Int. Cl.
*H01R 43/04*    (2006.01)

(52) U.S. Cl. ........... 29/525.01; 29/867; 29/828; 29/861; 29/863

(58) Field of Classification Search ............... 29/428, 29/458, 461, 525.01, 828, 861, 863, 867
See application file for complete search history.

(56) References Cited

U.S. PATENT DOCUMENTS

| | | | | |
|---|---|---|---|---|
| 3,605,068 | A * | 9/1971 | Rayburn | 439/291 |
| 3,696,563 | A * | 10/1972 | Rands | 451/466 |
| 4,719,315 | A * | 1/1988 | Gregorac | 174/73.1 |
| 4,733,464 | A * | 3/1988 | Gregorac | 29/867 |
| 5,249,248 | A * | 9/1993 | Arroyo et al. | 385/113 |
| 5,345,526 | A * | 9/1994 | Blew | 385/112 |
| RE36,592 | E * | 2/2000 | Giebel et al. | 385/100 |
| 2008/0069502 | A1* | 3/2008 | Ma | 385/77 |
| 2008/0248680 | A1* | 10/2008 | Stoner et al. | 439/357 |
| 2009/0190889 | A1* | 7/2009 | Robinson et al. | 385/110 |

* cited by examiner

*Primary Examiner* — Derris Banks
*Assistant Examiner* — Anthony Green
(74) *Attorney, Agent, or Firm* — J. Wiley Horton

(57) ABSTRACT

A method for straightening, constraining, cutting and terminating a multi-stranded, non-parallel cable. The cable filaments are aligned. A binder is then applied to the cable to maintain the alignment. The cable is then cut to a desired length. Each strand or group of strands is then placed in an individual termination. Each individual termination is then attached—either directly or through intermediate devices—to a collector.

20 Claims, 31 Drawing Sheets

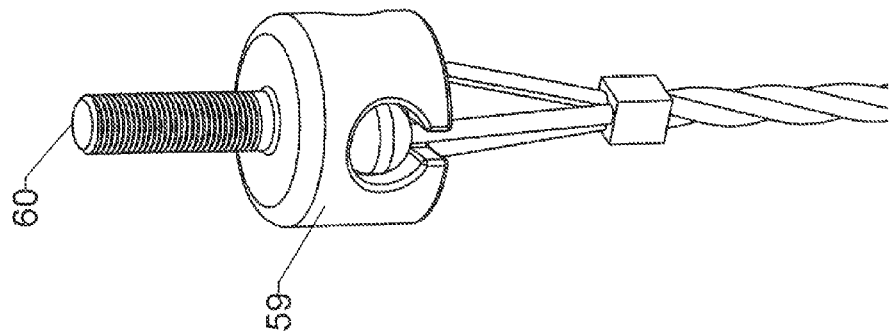
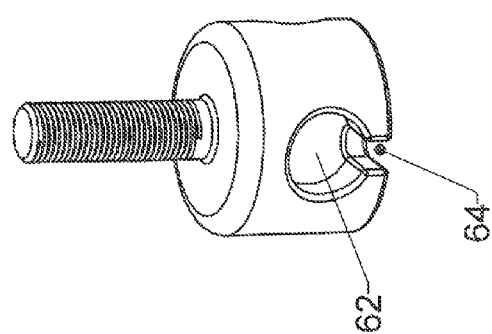
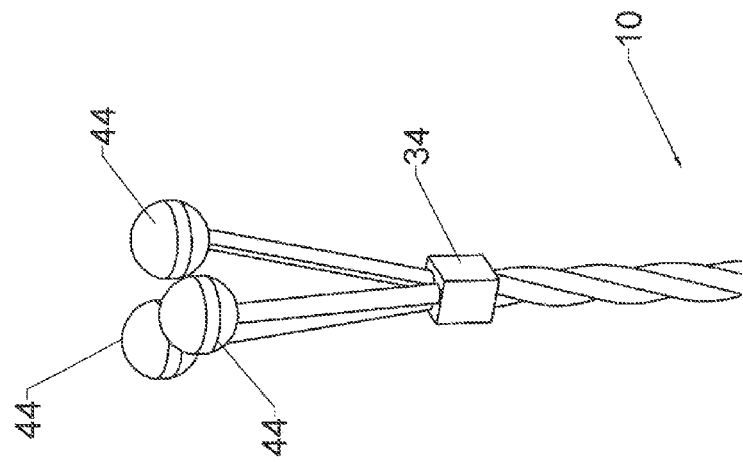
FIG. 17

METHOD OF TERMINATING A STRANDED SYNTHETIC FILAMENT CABLE

CROSS-REFERENCES TO RELATED APPLICATIONS

This is a non-provisional patent application claiming the benefit, pursuant to 37 C.F.R. §1.53(c), of an earlier filed provisional application. The provisional application was assigned Application Ser. No. 61/277,385. It was filed on Sep. 24, 2009 and listed the same inventor.

STATEMENT REGARDING FEDERALLY SPONSORED RESEARCH OR DEVELOPMENT

Not Applicable.

MICROFICHE APPENDIX

Not Applicable

BACKGROUND OF THE INVENTION

1. Field of the Invention

This invention relates to the field of synthetic cable terminations. More specifically, the invention comprises a method for terminating a multi-stranded cable having at least a partially non-parallel construction.

2. Description of the Related Art

Synthetic rope/cable materials have become much more common in recent years. These materials have the potential to replace many traditional wire rope assemblies. However, the unique attributes of the synthetic materials can—in some circumstances—make direct replacement difficult. The smallest monolithic component of a synthetic cable will be referred to as a filament. Bundles of such filaments will be referred to as a "strand." Strands are then gathered to make a cable. In some instances strands will be grouped into "strand groups," and these strand groups will then be gathered to make a cable.

A synthetic filament is analogous to a single wire in a bundled wire rope. However, in comparison to the relatively stiff steel wire used in a wire rope, the synthetic filament: (1) is significantly smaller in diameter; (2) is significantly less stiff (having very little resistance to buckling); (3) has a much lower coefficient of friction.

These differences become particularly significant when dealing with a multi-stranded cable having a non-parallel construction. A discussion of the prior art will illustrate this point. FIG. 1 shows a prior art cable 10 constructed by helically winding six exterior strands 12 around a single core strand. This is a partially non-parallel construction. The single core strand runs parallel to the cable's central axis. However, the six exterior strands form a helical path and are clearly not parallel to the central axis. Such a cable may generally be referred to as having a "non-parallel" construction. A non-parallel cable may have some parallel components (such as a core strand or bundle of strands and possible one or more parallel outer layers). However, a load-bearing portion of its total mass is made of non-parallel strands. These may assume the form of a helix (as shown in FIG. 3), a braid, or any other suitable configuration.

Those skilled in the art will know that a construction such as shown in FIG. 1 does not distribute equal loads in all the strands when the cable is loaded in tension. The helical winding in the outer layer will produce an "unwinding" force as all the strands attempt to straighten under tension. This phenomenon becomes even more complex with three and four layer non-parallel cables. These tend to include overlapping helical layers with alternating directions of twist. Shorter strands tend to receive a relatively larger tensile load than longer strands.

Individual wire strands in a traditional wire rope such as depicted in FIG. 1 have relatively high strand-to-strand friction forces. These forces tend to inhibit the strands slipping over one another. Thus, a wire rope cable tends to retain a stable cross section and tends to distribute tensile loads fairly evenly. Further, the strands do not tend to be displaced longitudinally (along the direction of the cable strand).

FIGS. 2 and 3 illustrate a typical construction for a strand made of synthetic filaments. In FIG. 2, each strand 12 may include a large number of filaments 16 encompassed within an encircling jacket 14. In other instances, the filaments will be twisted or braided together with no external jacket.

In FIG. 3, groups of seven strands 12 are twisted to form seven strand groups 20. These strand groups are then assembled and retained in position by a much larger encircling jacket 14 (which may be an extruded polymer, a braided outer layer of strands, or even a "whipping" of a single strand wrapped helically around the entire cable). Again, a jacket may or may not be included. If the strand groups are twisted or woven then the external jacket may be omitted. The reader will observe that each strand group 20 is actually parallel (the center axis of each strand group runs parallel to the center axis of the cable as a whole). However, within each strand group most of the individual strands are non-parallel.

Cutting, handling, and terminating such cable assemblies present new challenges. Even a relatively large cable 10 such as shown in FIG. 3 has little compressive stiffness along the direction of the center axis. This means that individual filaments and strands can easily slip longitudinally over each other. If the cutting and terminating method does not account for this factor, the completed cable may have wide variations in filament lengths. This problem of course means that the shorter filaments will receive a higher load and will fail prematurely.

FIG. 4 shows a length of cable 10 stored in a coil 22 (The coil is typically formed by winding the cable onto a spool). The cable is typically straightened for processing. Unconstrained bends occurring in this process can cause unwanted filament dislocations. Accordingly, it is important to constrain the cable so that these dislocations may be reduced or eliminated.

Problems also arise when a sheared end is locked into a termination in order to create a termination. If some filaments are longitudinally dislocated during the process leading up to the addition of the termination, then the resulting cable will not have an even load distribution across its filaments.

It would therefore be advantageous to provide a method of cutting and terminating a multi-strand non-parallel cable which would reduce the problems inherent in the use of synthetic filament ropes/cables. The present invention proposes just such a method.

BRIEF SUMMARY OF THE PRESENT INVENTION

The present invention comprises a method for straightening, constraining, cutting and terminating a multi-stranded, non-parallel cable. The cable filaments are aligned. A binder is then applied to the cable to maintain the alignment. The cable is then cut to a desired length. Each strand or group of strands is then placed in an individual termination. Each individual termination is then attached—either directly or through intermediate devices—to a collector.

Thus, the collector acts as a unified termination for the cable as a whole. However, each strand or group of strands has been cut, positioned, and locked into a relatively small termination. The relatively large cable is broken into smaller components so that consistent and repeatable termination technology known for use in small cables can be applied to create a termination for a much larger cable.

BRIEF DESCRIPTION OF THE SEVERAL VIEWS OF THE DRAWINGS

FIG. 17 is a perspective view, showing the use of a single piece collector to unify individual terminations.

REFERENCE NUMERALS IN THE DRAWINGS

| 10 | cable | 12 | strand |
|----|-------|----|--------|
| 14 | jacket | 16 | filament |
| 20 | strand group | 22 | coil |
| 24 | helical wrap | 26 | binder |
| 28 | curved section | 30 | straight section |
| 32 | cutting plane | 34 | retained binder |
| 36 | splayed section | 38 | swaged termination |
| 40 | spliced eye | 42 | threaded extension |
| 44 | cast spherical termination | 46 | cast conical termination |
| 48 | termination block portion | 50 | tapered passage |
| 52 | fastener | 54 | threaded receiver |
| 56 | through hole | 58 | unified block |
| 59 | collector | 60 | threaded shaft |
| 62 | spherical socket | 64 | slot |
| 66 | termination | 68 | outer strand |
| 70 | inner strand | 72 | center block |
| 74 | core portion | 76 | outer ring |
| 78 | connector | 80 | loading eye |
| 82 | alternate connector | 84 | alternate connector |
| 86 | strand guide channel | 88 | distal guide |
| 90 | strand guide | 92 | curved passage |
| 94 | cylindrical pocket | 96 | slot |
| 98 | seam | | |

DETAILED DESCRIPTION OF THE INVENTION

Figure 1:
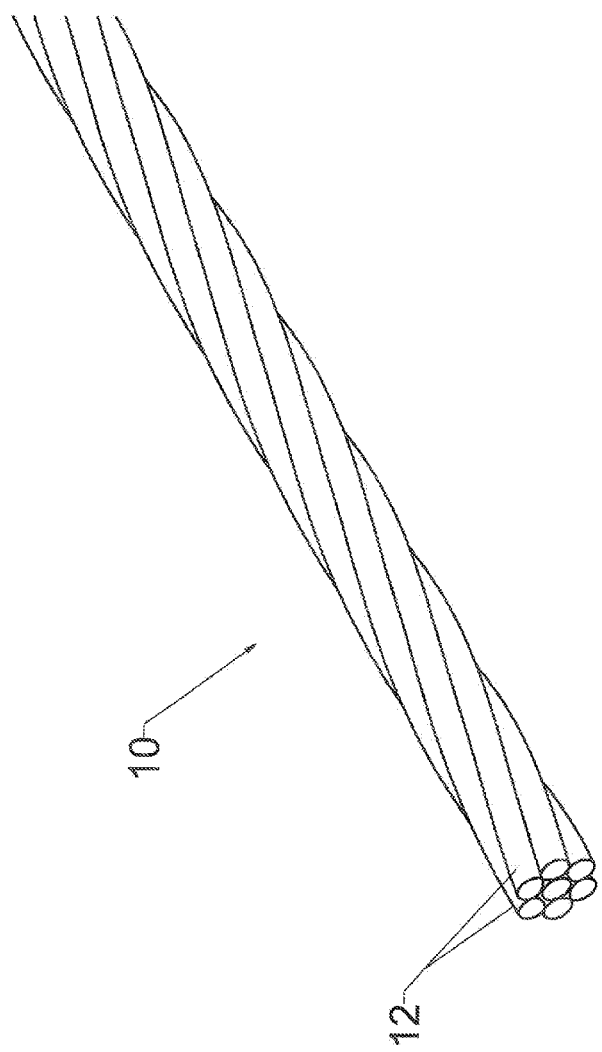
FIG. 1 is a perspective view, showing a prior art cable made of seven strands.
Figure 2:
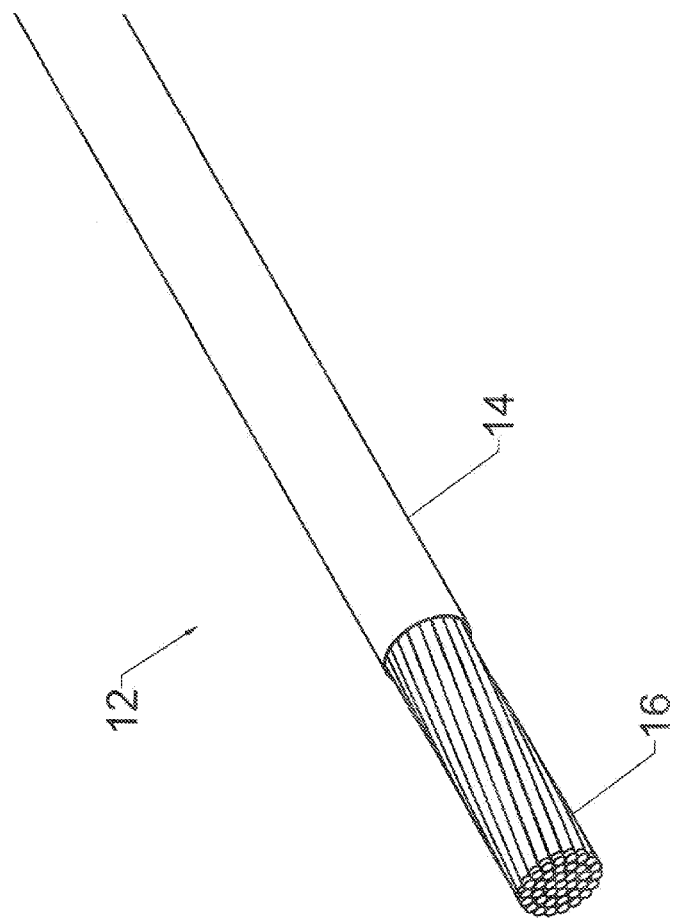
FIG. 2 is a perspective view, showing an individual strand made of thirty-seven synthetic filaments encased within a jacket.
Figure 3:
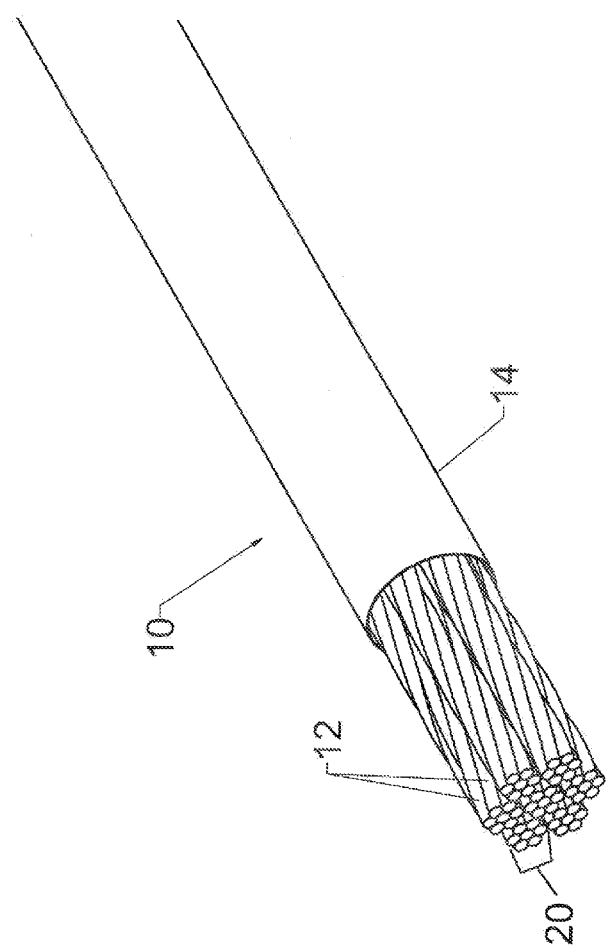
FIG. 3 is a perspective view, showing a prior art cable made of seven strand groups, each of which strand groups has seven strands.
Figure 4:
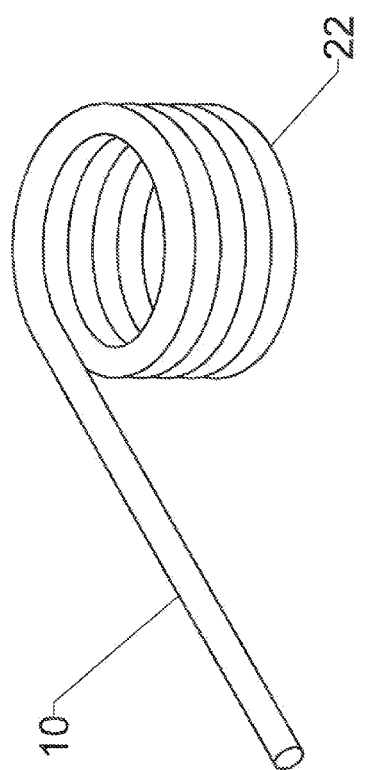
FIG. 4 is a perspective view, showing a coil of cable.

Ensuring appropriate filament alignment during the cutting and termination steps is a significant part of the inventive process. Returning to FIG. 4, the reader will recall that most synthetic cables are stored in a coil 22 wound on a spool. A portion of the cable must be straightened before it can be cut and terminated.

The individual strands and filaments of the synthetic cable have so little stiffness and filament-to-filament friction that it is difficult to prevent the filaments slipping longitudinally as the cable is manipulated. As stated previously, longitudinal slipping of some filaments results in unequal filament length in the finished cable. Some cables have an encapsulating jacket which tends to provide an inward compressive force. The jacket may be an entirely separate material—such as an extruded thermoplastic—or it may be a braid or winding of additional filaments of the same type used in the balance of the cable. The inward compressive force tends to increase filament-to-filament friction and thereby prevent longitudinal slipping.

Figure 5:
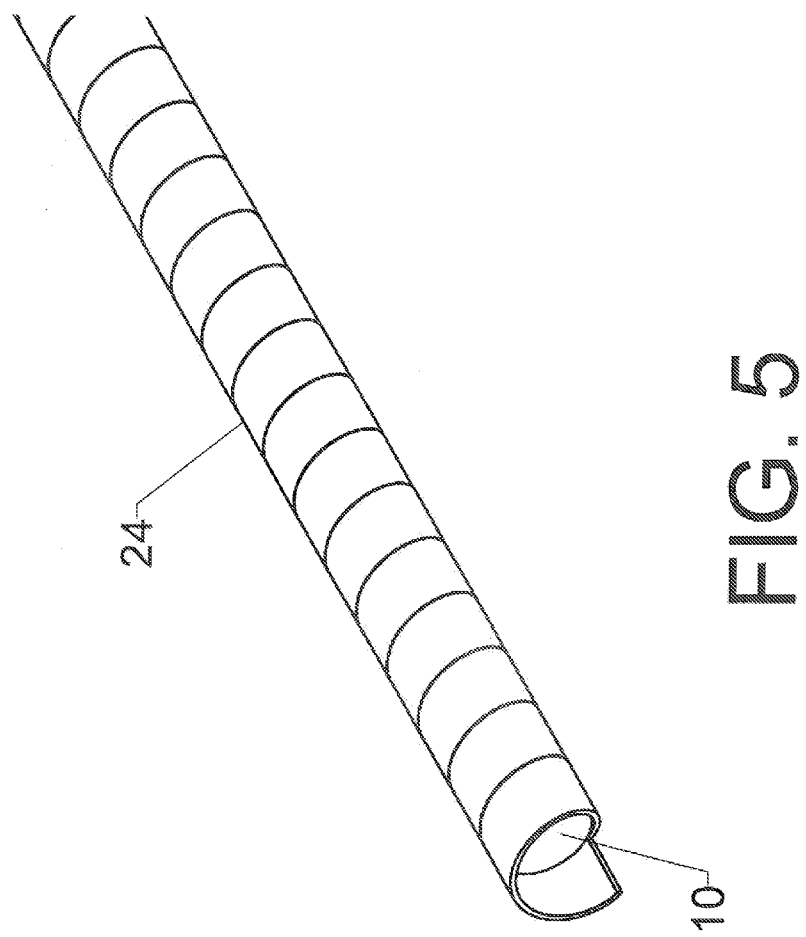
FIG. 5 is a perspective view, showing the use of a helical wrap to stabilize the filament alignment of a synthetic cable.

Other cables have no compressive jacket. In those instances, it is important to provide a feature which creates the inward compressive force (and even some jacketed cables need an additional inward compressive force). This feature is generally referred to as a "binder." FIG. 5 shows a cable 10 with the addition of a binder. Helical wrap 24 has been wound around the cable's exterior to provide the desired inward compressive force. The cable may then be cut through this helical wrap. The helical wrap is left in place after the cut is made to maintain the desired filament alignment until the time the termination is attached to the end of the cable. It may remain in place beyond that time or in some instances may be removed. The reader should note that the helical wrap may or may not be applied to the entire length of the cable.

Figure 6:
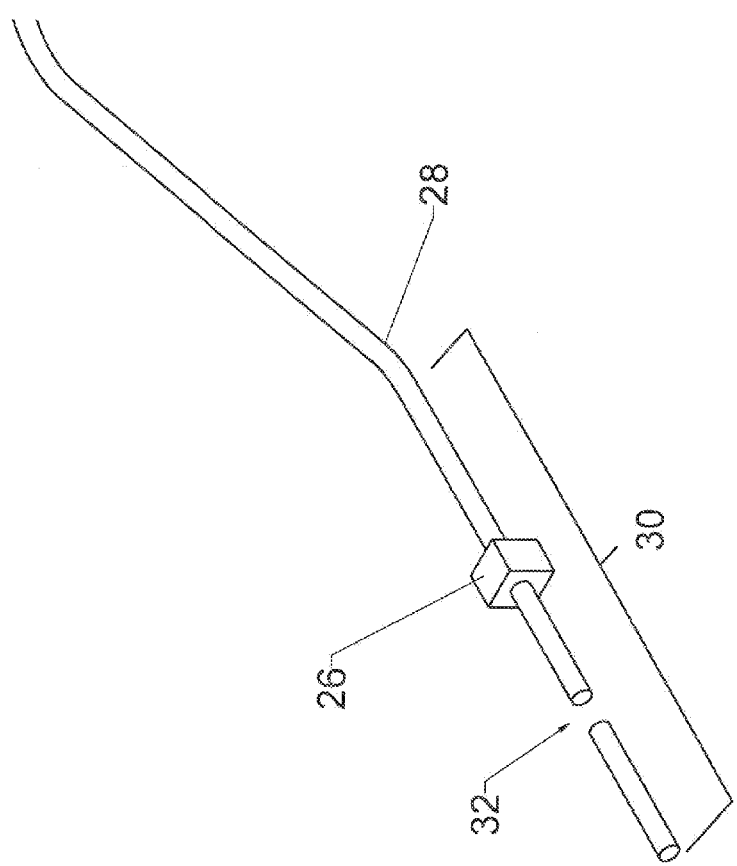
FIG. 6 is a perspective view, showing the use of a binder in a cutting operation.

FIG. 6 simplistically depicts another approach to adding the desired binder element. Suitable hardware is used to straighten the cable and maintain the filament alignment. Binder 26 is then added to maintain the desired alignment within straight section 30. The binder is shown as a pair of clamping blocks but this is intended to be only a conceptual illustration. The binder could be a pair of clamping members, but it could also be a molded in situ jacket, a length of heat shrink tubing, a tape wrap, a cord whipping, or similar item. In whatever form it takes, binder 26 securely grips the cable in order to retain the desired filament alignment. Curved section 28 contains longitudinal filament dislocations. However, it is far enough away from the binder and cutting plane 32 that it does not cause a problem. Additional tension may be added to the cable prior to cutting.

Figure 7:
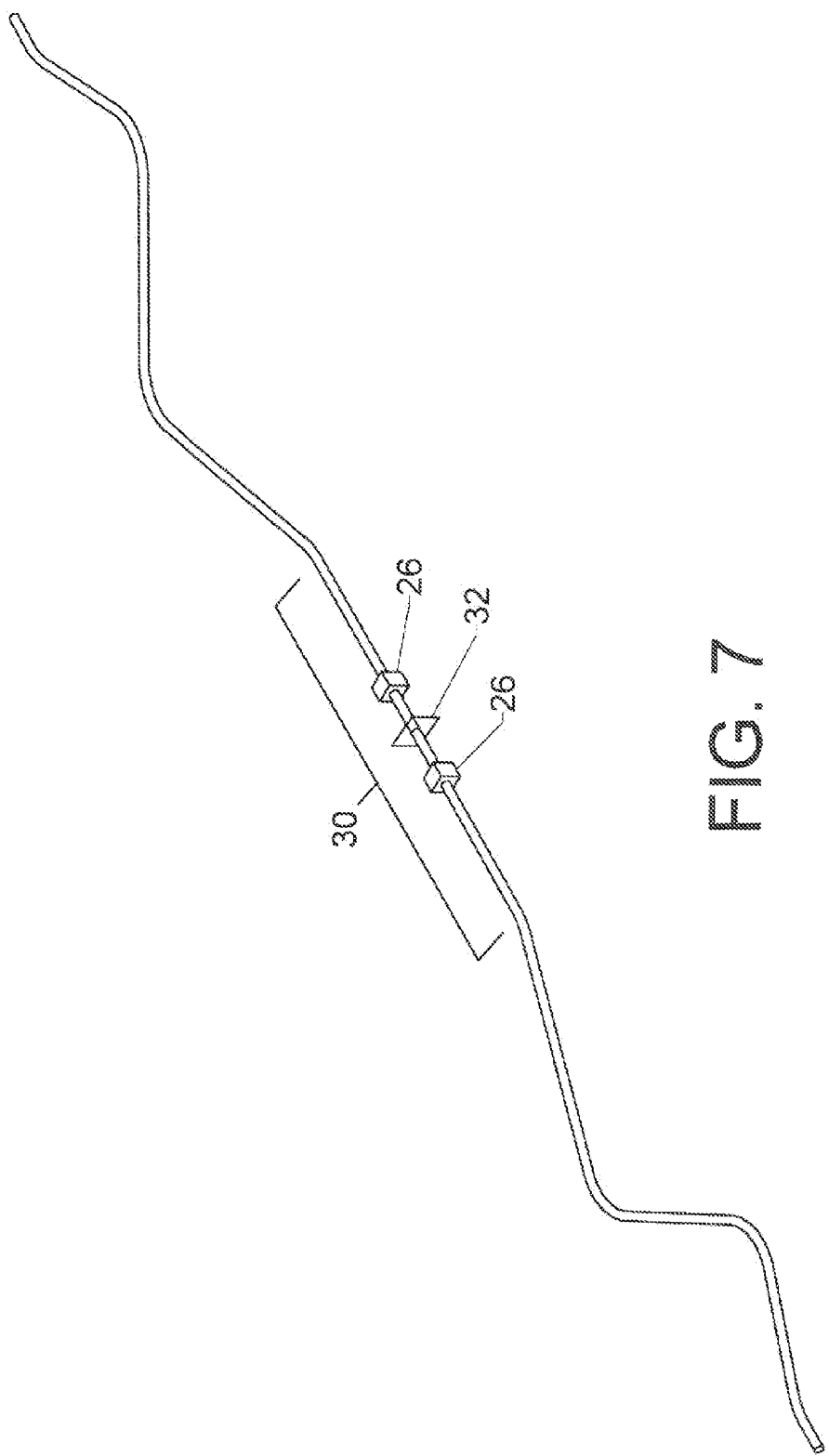
FIG. 7 is a perspective view, showing the use of two binders in a cutting operation.

FIG. 7 shows a cutting operation using two binders 26. These may be placed at any desired point on the cable. As an example, the binders may assume the form of two pieces of heat shrink tubing which are placed on the cable and then heated in order to produce the desired contraction. Once in place, the two binders may also be pulled away from each other in order to place additional tension on a portion of straight section 30 before the cut is made at cutting plane 32.

Figure 8:
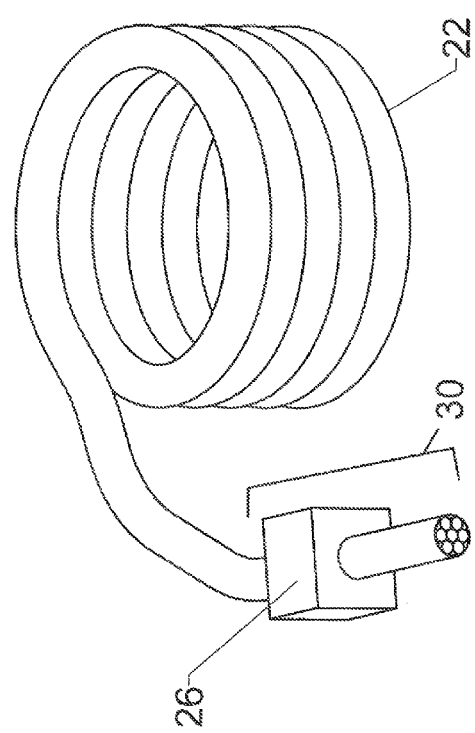
FIG. 8 is a perspective view, showing the use of a binder in a cutting operation.

FIG. 8 shows the cut end of a cable. Binder 26 has been applied to retain the desired filament alignment. The cut has then been made. The application of the binder in the middle of straight portion 30 has retained the strands in the desired alignment.

Once the cable has been cut to a desired length, it is important to maintain the filament alignment during the process of adding a termination to the end of the cable. The word "termination" should be broadly construed to mean any device affixed to a cable or a strand of a cable. A termination is usually affixed to the end of a cable as a whole in order to transmit a tensile load to the cable. However, terminations may be placed on the cable other than at an end and may be added for reasons other than transmitting a load. In the present invention, multiple individual terminations will be added to the strands or strand groups within the cable.

Figure 9:
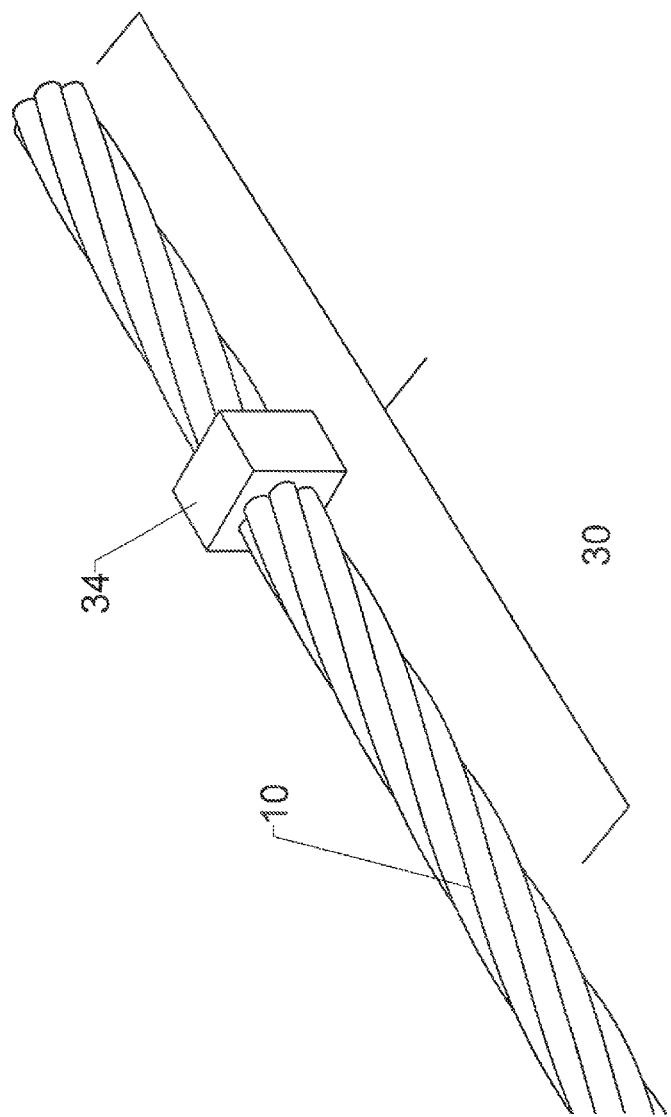
FIG. 9 is a perspective view, showing the use of a retained binder.

FIG. 9 shows a cable 10 made of six strands wrapped around a central strand. Under the inventive method, an individual termination will be placed on the end of each strand. In order to do that, the strands must generally be separated to allow clearance for the termination operation. Separating the strands tends to introduce strand misalignments. In order to minimize this concern, retained binder 34 has been added to the cable. This is conceptually shown as a block, but as stated previously this may assume many forms (heat shrink tubing, tape winding, etc.).

The retained binder tends to compress and lock the strands together so that when the straight section is splayed to add the terminations the filaments won't tend to slip. The retained binder can simply be a group of two or more pieces fastened together around the cable. Another approach is to clamp a temporary mold over the cable and inject a thermoplastic resin into the mold to form the retained binder in situ. Cross-linking reactive polymers may be used, as well as air or light-activated compounds. The term "retained binder" should thus be broadly viewed to encompass anything which is affixed to the cable which provides the desired inward compressive force.

Figure 10:
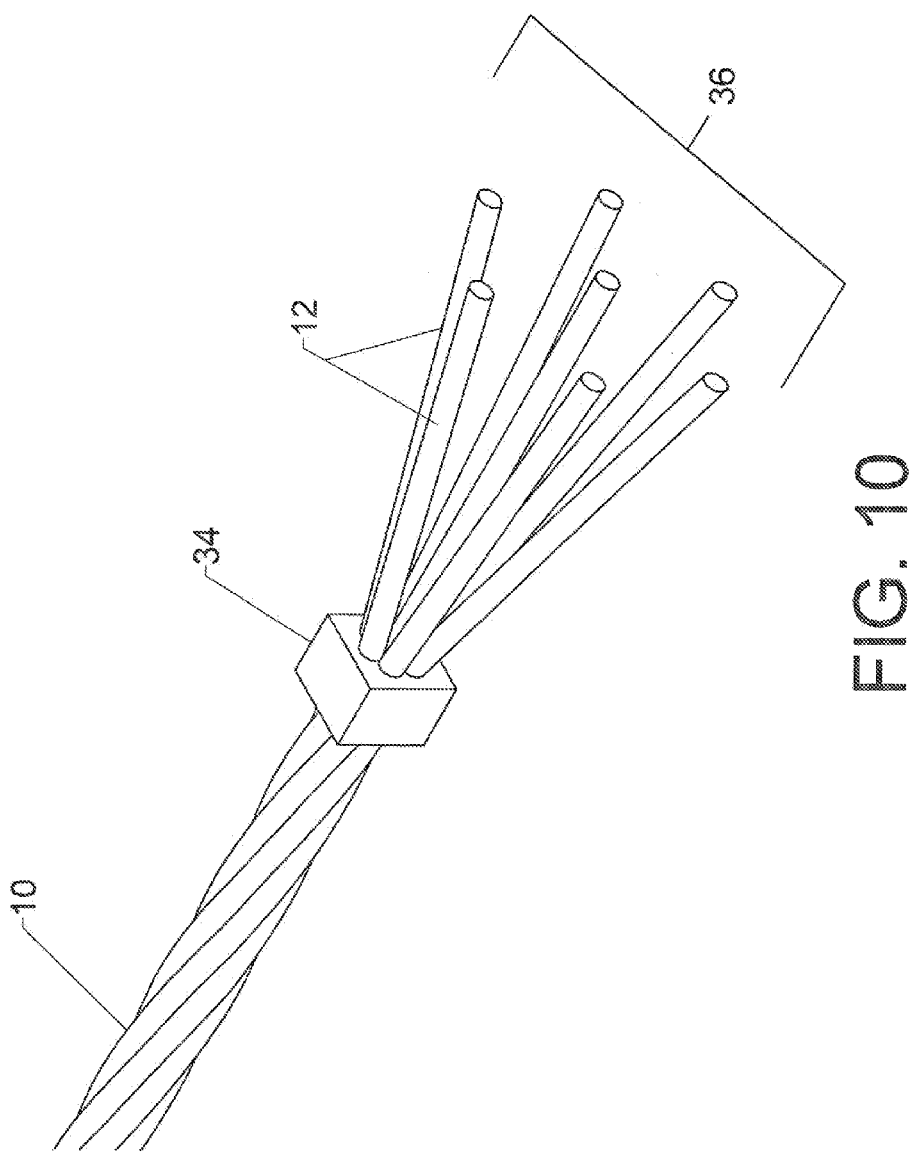
FIG. 10 is a perspective view, showing the splaying of individual strands beyond the retained binder.

FIG. 10 shows the same cable assembly after the strands 12 have been splayed to create splayed section 36. The reader will observe how retained binder 34 has retained the cable in a compressed bundle and restricted how far the splaying action can travel down the cable's length.

Figure 11:
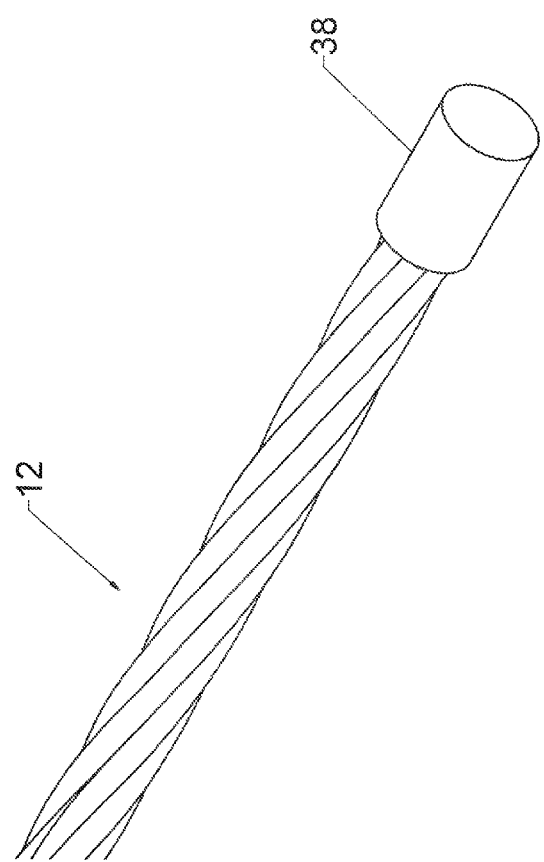
FIG. 11 is a perspective view, showing the installation of a potted termination on the end of a cable strand.

Once each strand is splayed a termination is placed on its end. FIGS. 11-14 show examples of terminations that can be formed. FIG. 11 shows an individual strand 12 (made up of many twisted filaments). Potted termination 38 has been added to the end of this strand to form a simple stop. A potted termination is often created by placing a termination with a tapered internal passage over the end of the cable and injecting a cross-linking resin into the internal passage. The resin hardens, thereby locking the filaments in the internal passage and securing the termination to the cable.

Figure 19:
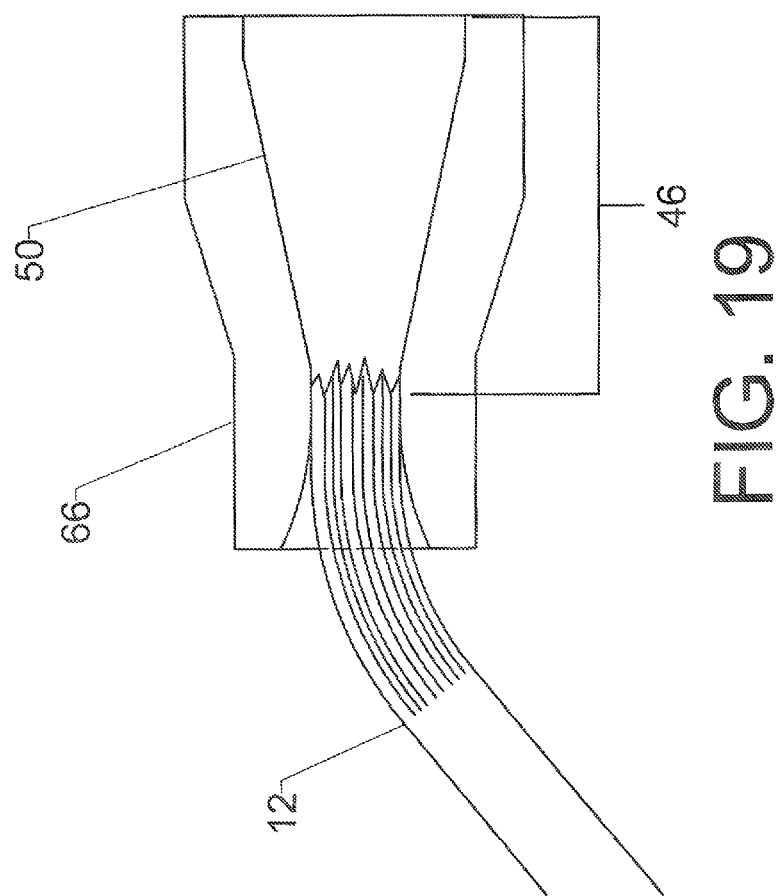
FIG. 19 is an elevation view with a cutaway, showing the potting of a length of strand into a termination.

FIG. 19 shows an example of this type of termination. Termination 66 is provided with tapered passage 50. Strand 12 is slipped through this tapered passage and the filaments near the end of the strand are preferably splayed. A potting resin is then infused through the tapered passage. When this hardens, the filaments are locked within tapered passage 50. They have in effect been "molded" into a cast conical termination 46. The cast conical termination is mechanically held within termination 66 via mechanical interference. Details of the potting and terminating processes may be found in U.S. Pat. No. 7,237,336 to Campbell (2007), which is hereby incorporated by reference.

Figure 12:
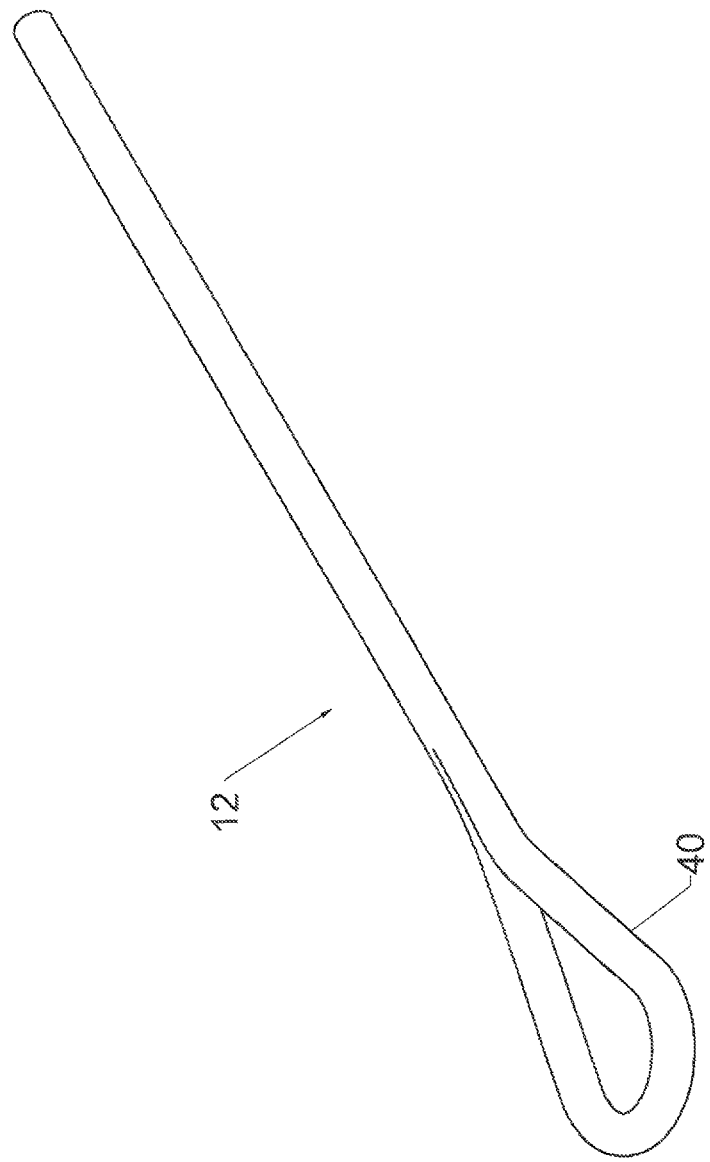
FIG. 12 is a perspective view, showing the installation of a spliced eye on the end of a cable strand.

FIG. 12 shows a completely different type of termination. The strand 12 shown in FIG. 12 is a braided strand. The termination assumes the form of spliced eye 40, which is made by separating some of the filaments, forming them into a loop, and then weaving them into the main body of the strand.

Figure 13:
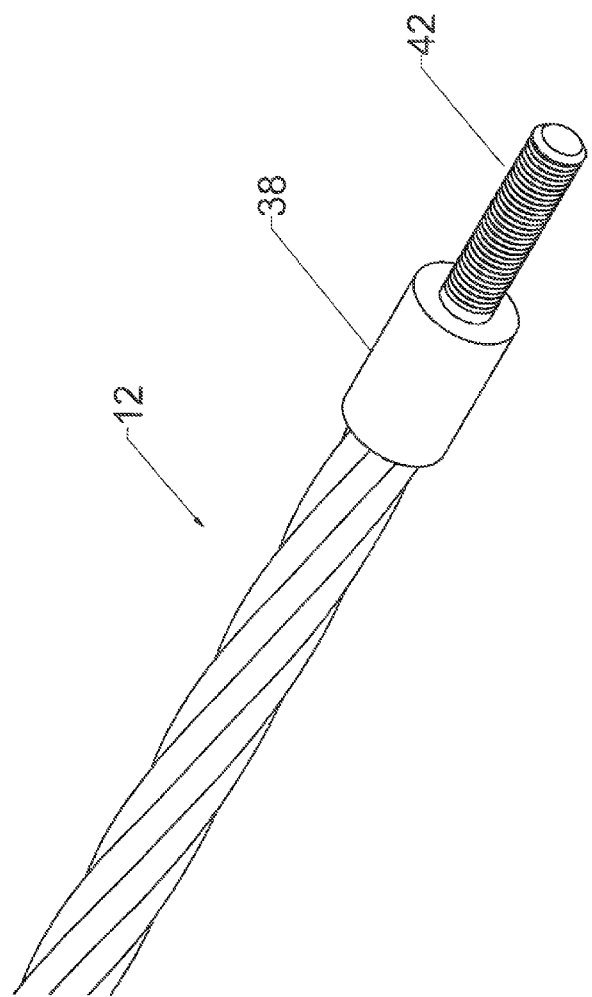
FIG. 13 is a perspective view, showing the installation of a swaged termination with a threaded extension on the end of a cable strand.

FIG. 13 shows a swaged termination 38 with an attached threaded extension 42. A threaded extension can be a convenient feature since it allows tension to be adjustably applied to the individual strand 12.

Figure 14:
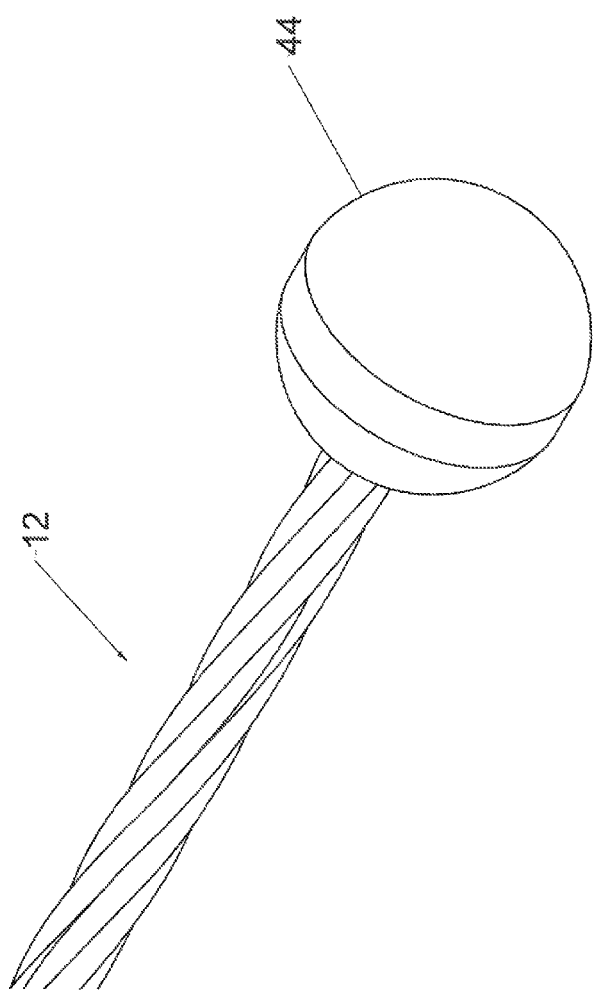
FIG. 14 is a perspective view, showing the installation of a cast spherical termination on the end of a cable strand.

FIG. 14 shows still another type of termination—cast spherical termination 44. This may be a solid object with an internal passage that is potted to connect the object to the strand. On the other hand, a removable mold may be placed over the end of the strand and the sphere may be cast in situ using high strength epoxy (preferably including a reinforcing fiber).

The examples of FIGS. 12-14 are three examples among many more possibilities. The present inventive method can be used with a virtually endless variety of terminations.

Once each strand or group of strands is locked into a termination, the terminations must be gathered to form a unified connection point for the cable as a whole. The component used to gather and secure the individual terminations is referred to as a "collector." The collector may be a single piece or a complex, multi-piece component. The term includes embodiments using interlocking components and hybrid designs where one piece may terminate multiple strands and other pieces may terminate only a single strand.

Figure 15:
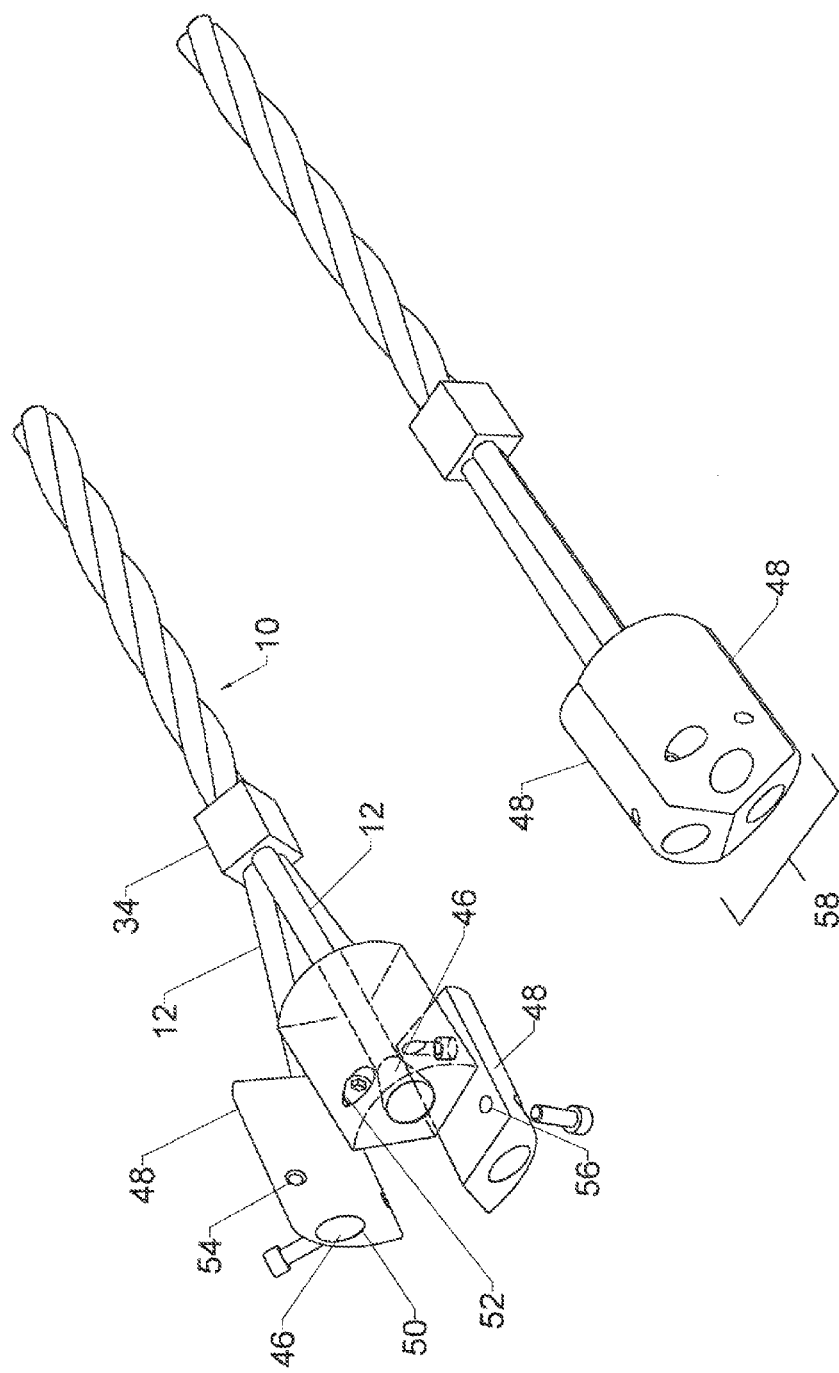
FIG. 15 is a perspective view, showing the use of a multi-piece collector to unify individual terminations into a single piece.
Figure 16:
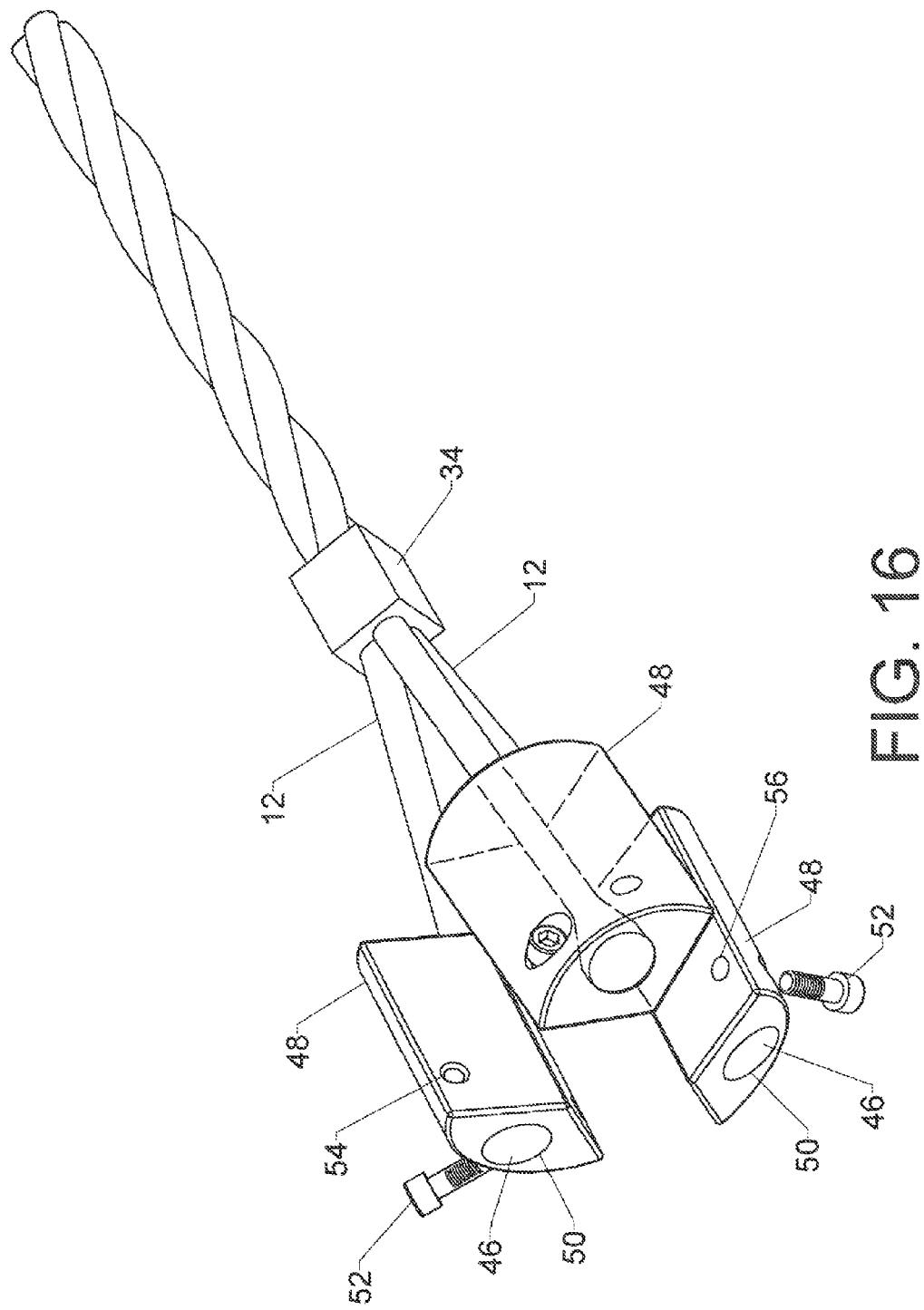
FIG. 16 is a perspective view, showing the use of a multi-piece collector to unify individual terminations into a single piece.

FIGS. 15 and 16 illustrate an example using a multi-piece collector. The left-hand view in FIG. 15 shows the pieces of the collector before it is assembled. Each strand 12 is terminated by a cast conical termination 46. The cast conical termination in this particular example is a conically-shaped "plug" of reinforced epoxy that is cast in situ on the cable's end.

Three termination block portions 48 are used—one for each strand. Each termination block portion 48 has a tapered passage 50 passing completely through it. This tapered passage is designed to grip and retain a cast conical termination 46.

One approach to assembling such a device is to splay the three strands 12, then pass a termination block portion 48 down each strand (threading the strand through the tapered passage in each termination block portion so that the cut end of each strand protrudes beyond its corresponding termination block portion). A cast conical termination 46 is then formed on the end of each strand. Each termination block portion is then pulled up and over the corresponding cast conical termination—as shown in the left hand view of FIG. 15.

Fastening features are preferably provided to secure the three termination block portions 48 together. Three fasteners 52 are provided. Each termination block portion has a through hole 56—including a shoulder positioned to mate with the head of fastener 52—and a threaded receiver 54. The fasteners are screwed into position to lock the three pieces together—as shown in the right hand view of FIG. 15. Once locked together, the three pieces are designated as unified block 58. The unified block is a type of "collector." It gathers and unifies the individual terminations on the strands.

FIG. 16 shows an enlarged view of the assembly shown in FIG. 15. The reader may more easily observe the geometry of the fasteners 52, the through holes 56, and the threaded receiver 54. Of course, many other devices could be used to lock the multiple pieces together without the need for separate fasteners.

An alternate embodiment of FIGS. 15 and 16 would use the termination block portions 48 directly as the terminations. In this embodiment the filaments of a particular strand 12 would be placed within a tapered passage 50 within a particular termination block portion 48. Potting compound would then be injected into the tapered passage and allowed to harden, thereby locking the filaments in that particular strand to the particular termination block.

FIG. 17 shows a different type of collector. The right hand view shows a cable 10 having three individual strands. A cast spherical termination is placed on the end of each individual strand. Collector 59 is provided. In the central view of FIG. 17, the reader will observe how the collector includes spherical socket 62 with an intersecting slot 64. The collector includes three such spherical sockets spaced to correspond to the three cast spherical terminations 444.

The user may place the three cast spherical terminations into the three spherical sockets to form the assembly shown in the left hand view. The geometry of the spherical sockets is preferably selected so that when the assembly is placed under tension the three cast spherical terminations will be milled inward toward the center of collector 59—thereby locking the assembly together. The collector and the terminations are preferably assembled in a fashion which aligns each individual termination with the individual strand it is attached to. The geometry depicted in FIG. 17 is one way to accomplish this task.

Figure 18:
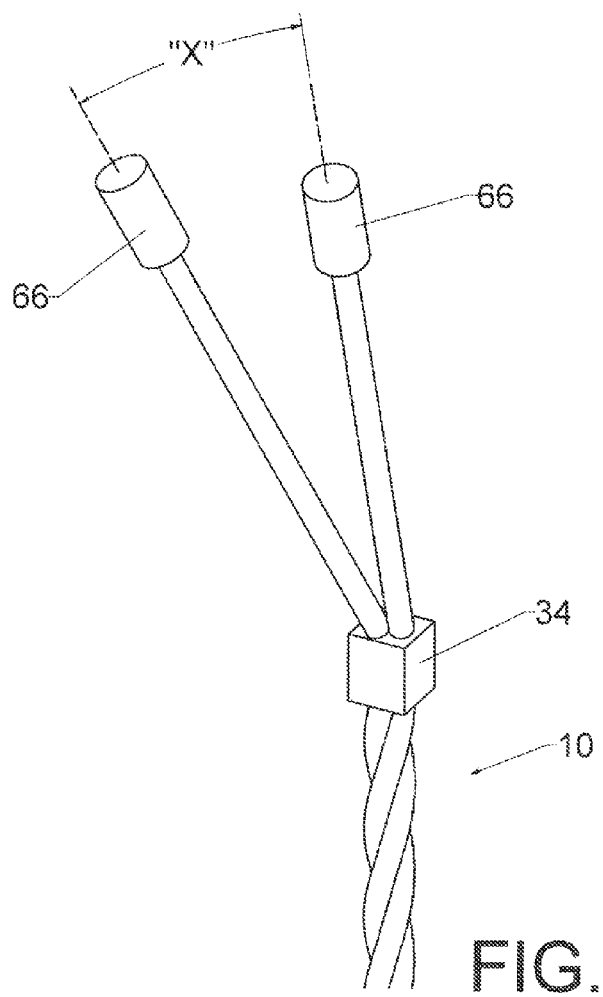
FIG. 18 is a perspective view, showing the use of angular offsets between individual strands.

FIG. 18 shows a simple cable 10 made by twisting two strands together. A retained binder 34 is provided. Two terminations 66 are added—one for each strand end. These may then be separated by an angle $\alpha$ prior to being placed in a collector. Multiple strands can be provided with angular offsets in one or two planes. By adding an individual termination to each individual strand (or strand group), alignment can be maintained between the termination and the strand. This is a significant feature of the present invention which becomes particularly significant for larger cables.

In other instances portions of the individual termination themselves can be used to guide the strand from its original path into alignment with the portion of the strand locked within the termination. FIG. 19 shows such a feature. Termination 66 includes a smoothly curved section in the region where the strand exits the termination.

Figure 20:
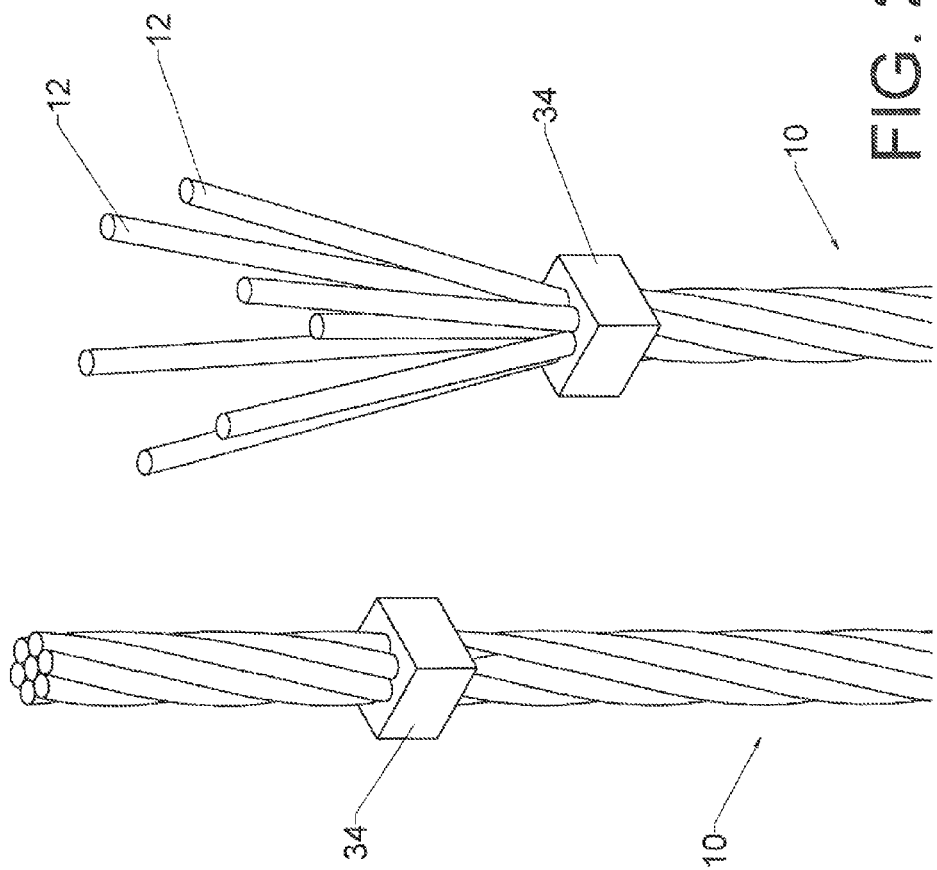
FIG. 20 is a perspective view, showing the splaying of individual strands prior to termination.
Figure 21:
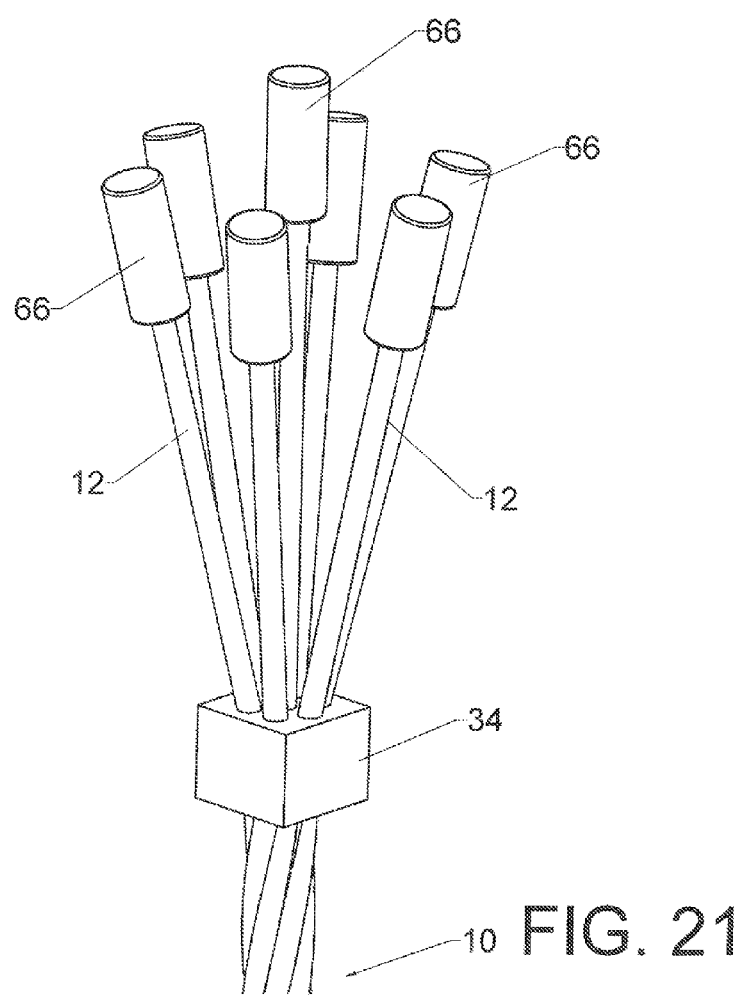
FIG. 21 is a perspective view, showing the cable of FIG. 20 after individual terminations have been placed on each strand.

In some instances the strands within a cable may be trimmed to different lengths during the process of adding the terminations. FIG. 20 shows two views of a cable 10 with a retained binder 34 attached. The strands have been splayed apart in the right hand view. When the strands are cut, they may be cut to different lengths. FIG. 21 shows a variable-length configuration after six terminations 66 have been added to the strands. The use of strands of varying length allows for more flexibility in the design of a suitable collector.

Figure 22:
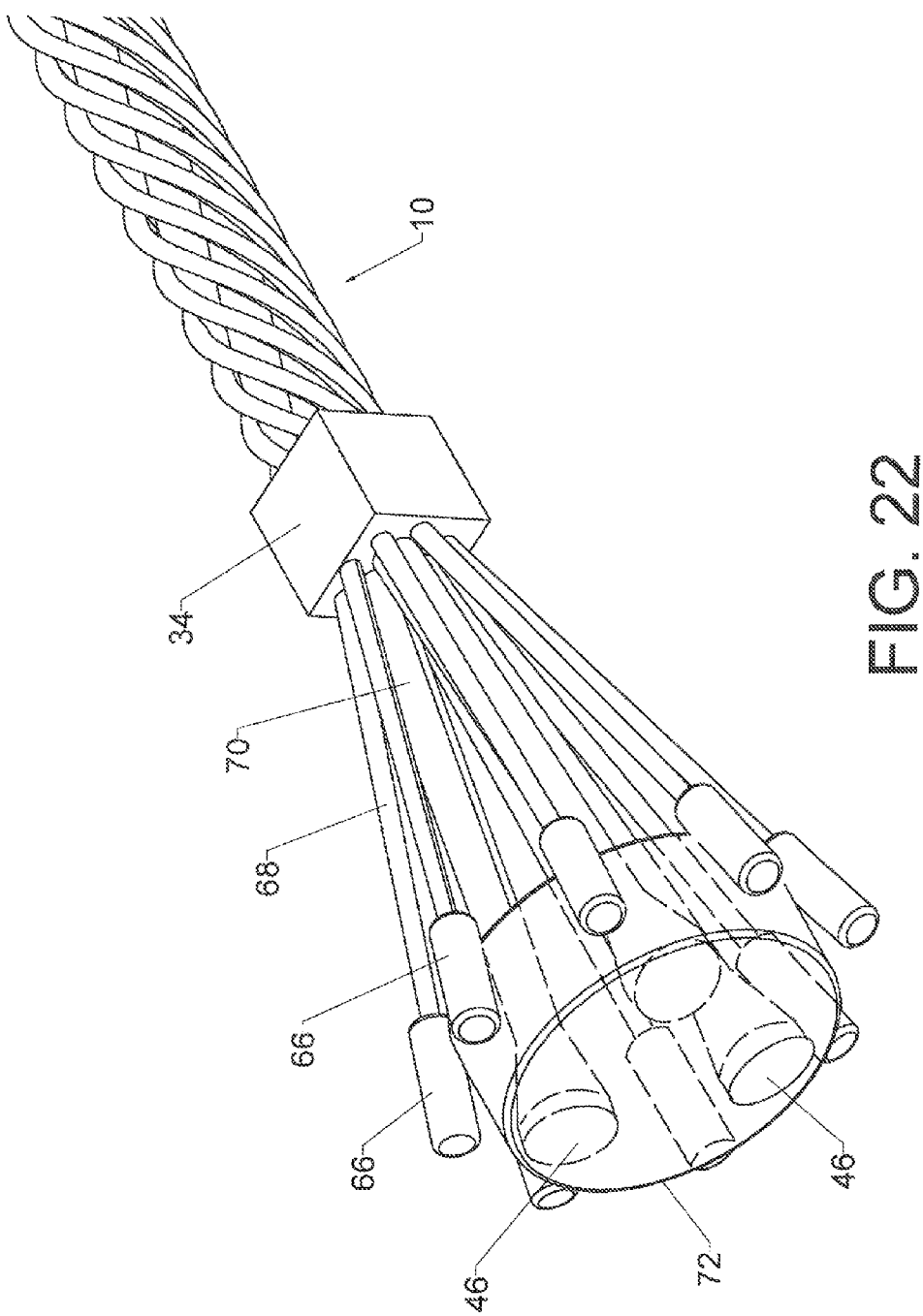
FIG. 22 is a perspective view, showing the use of a center block.

FIG. 22 shows a more complex cable 10 in which three core strands 70 are wrapped by eight outer strands 68. All are secured in a retained binder 34. The three core strands 70 are then secured in a center block 72 (which forms part of a larger collector) by securing the three cast conical terminations 46 in the center block (As discussed previously, the center block itself could serve as a single termination by potting the three core strands 70 directly into the center block. The eight terminations 66 on the eight outer strands 68 may then be secured separately.

Figure 23:
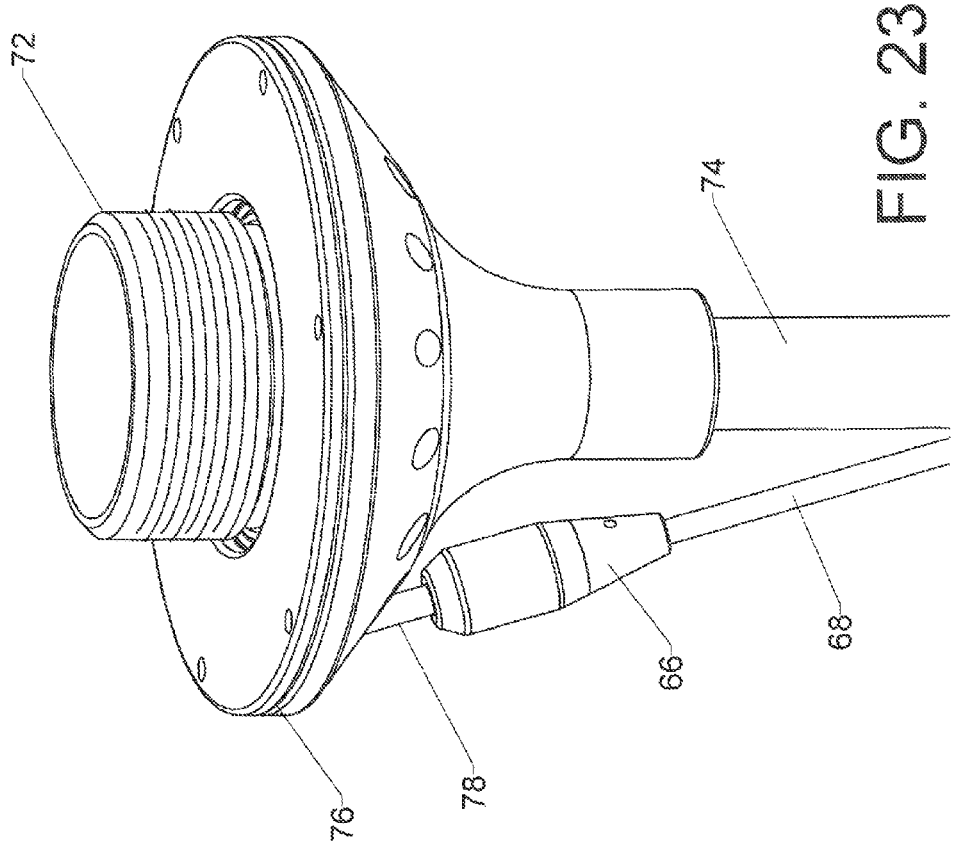
FIG. 23 is a perspective view, showing the use of a center block to attach a core portion of a cable and an outer ring to attach outer strands of the same cable.

FIG. 23 depicts a variation on this theme. The core strands are placed within core portion 74 (including a jacket surrounding the core strands). These are secured in center block 72. Outer ring 76 is connected to center block 72. A plurality of outer strands 68 (only one of which is shown in the view) are then connected to outer ring 76—preferably using a length-adjustable attachment. This example uses a ball on the end of threaded connector which is captured inside a socket in outer ring 76. The use of the ball and socket allows a good alignment between termination 66 and outer strand 68. In this version, termination 66 is attached to outer strand 68. A threaded connector 78 then attaches to outer ring 76. The threaded connector allows the tension placed on a particular outer strand to be individually adjusted.

Figure 24:
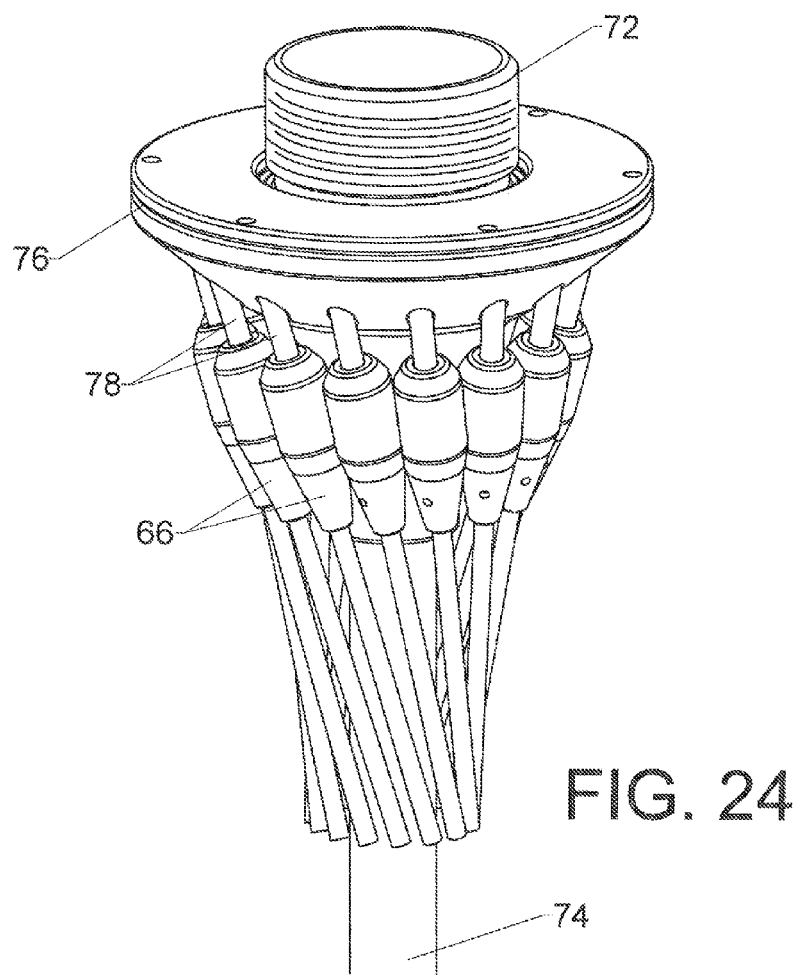
FIG. 24 is a perspective view, showing the assembly of FIG. 23 with all the outer strands attached.

FIG. 24 shows the same assembly with all the outer strands shown. Each outer strand 68 is connected to outer ring 76 by a length-adjustable attachment. Those skilled in the art will know that when the cable assembly of FIG. 24 is placed in tension, a torsional force between outer ring 76 and center block 72 will result. It is therefore preferable to provide a rotation-limiting connection between the outer ring and the center block. This can assume many forms, including making the two components out of a single piece of material.

Figure 25:
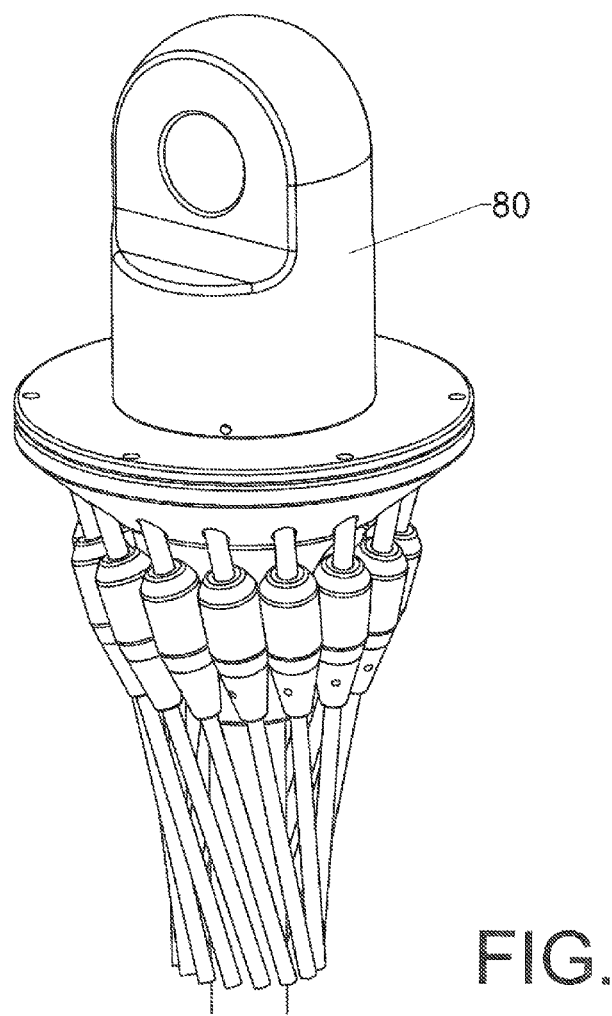
FIG. 25 is a perspective view, showing the assembly of FIG. 24 with a loading eye attached.

FIG. 25 shows the same assembly after loading eye 80 has been threaded onto center block 72. The reader will thereby perceive how the entire collector assembly can unify the numerous terminations on numerous strands to a single attachment point.

Figure 26:
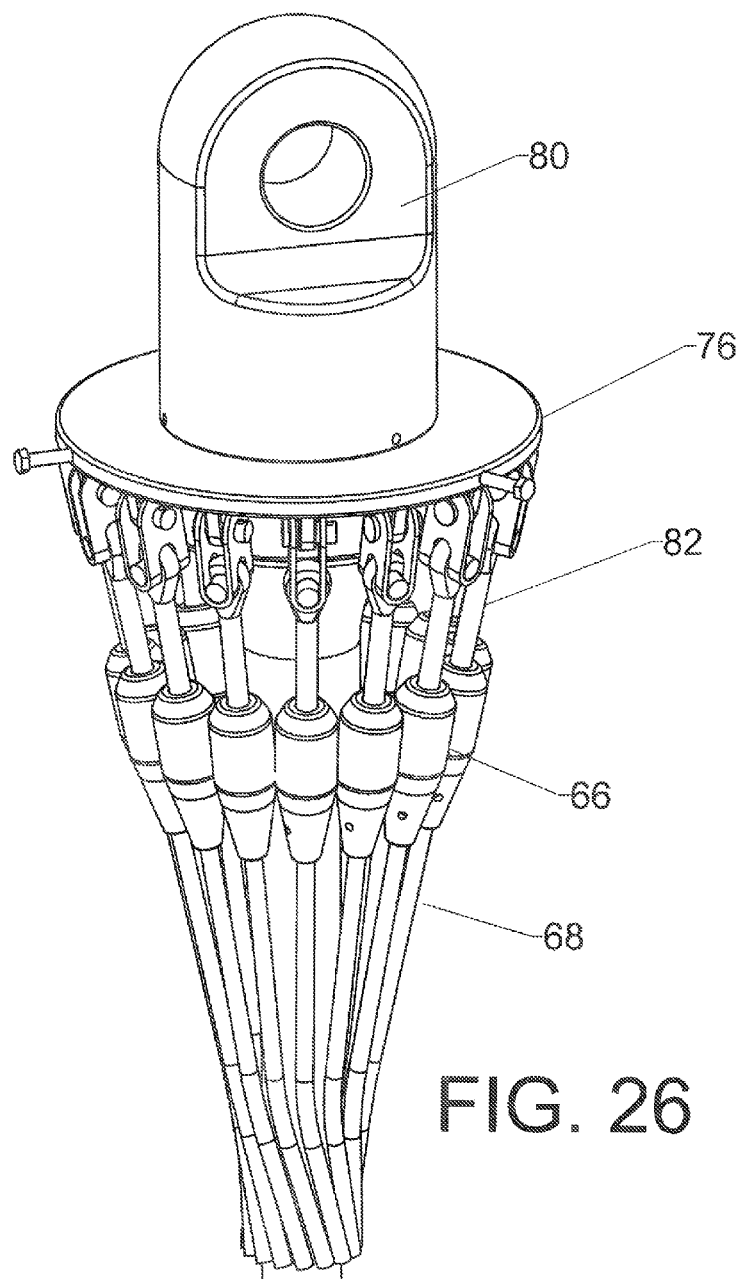
FIG. 26 is a perspective view, showing an alternate embodiment of the device of FIG. 25.

FIG. 26 shows an alternate embodiment. Alternate connectors 82 provide a pivotal attachment between the terminations 66 and outer ring 76. This allows some lateral flexing of the outer strands as the cable undergoes tension cycles. Those skilled in the art will realize that many other swiveling, pivoting, and/or length-adjustable attachment mechanisms could be used.

Figure 27:
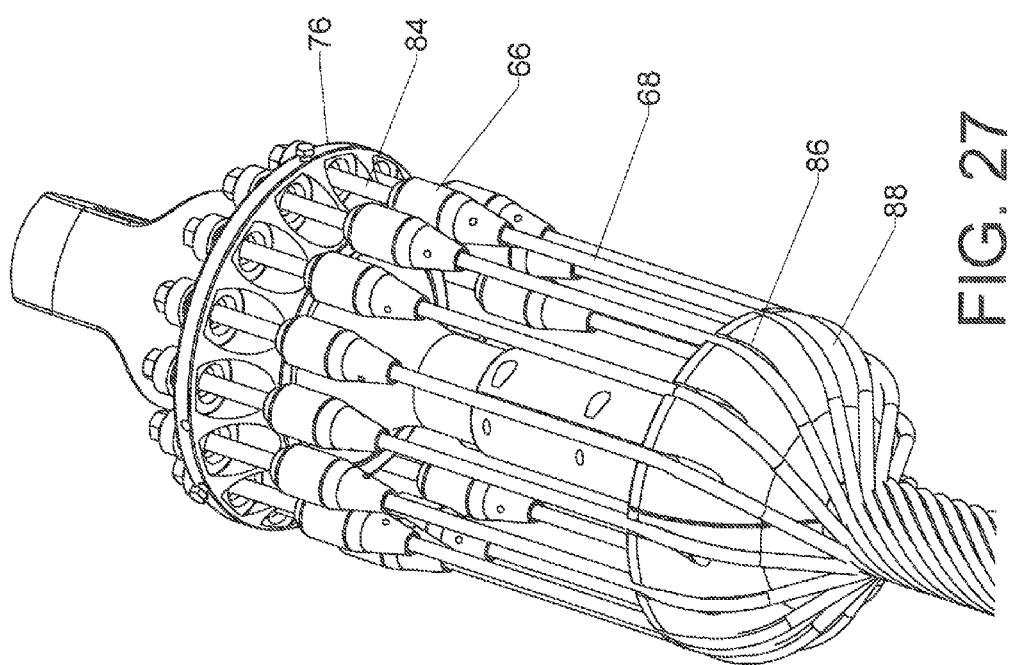
FIG. 27 is a perspective view, showing an alternate embodiment of the device of FIG. 25.

FIG. 27 shows yet another embodiment. Distal guide 88 is provided a short distance away from outer ring 76. Distal guide straightens the path of outer strands 68 so that they are straight for a short length before being attached to the outer ring. To that end, distal guide contains a strand guide channel 86 for each outer strand 68. The strand guide channel alters the course of the outer strands from a helical path to a straight path. The distal guide is one example of a strand guide, which may generally be considered anything which alters the path of the strand as it leaves the cable and more closely aligns it with the desired orientation of the termination. The particular strand guide shown is "distal" because it is separated from outer ring 76. However, in other embodiments it might not be separated at all.

Figure 28:
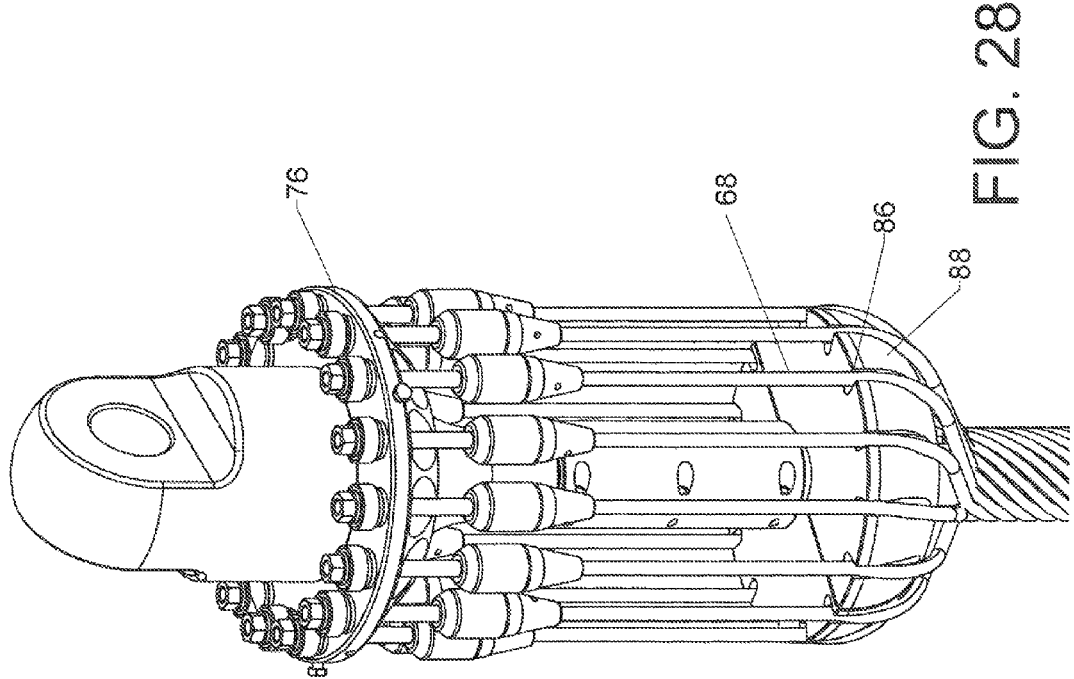
FIG. 28 is a perspective view, showing the embodiment of FIG. 27 from a different vantage point.

The core portion of the cable is contained within a rigid housing passing between the distal guide and the outer ring. FIG. 28 shows this assembly from another vantage point. The reader will observe that distal guide 88 is provided in two pieces so that it can be placed over the cable's core strands. The rigid housing between the distal guide and the outer ring is preferably also provided in two or more pieces so that it may be more easily assembled.

Figure 29:
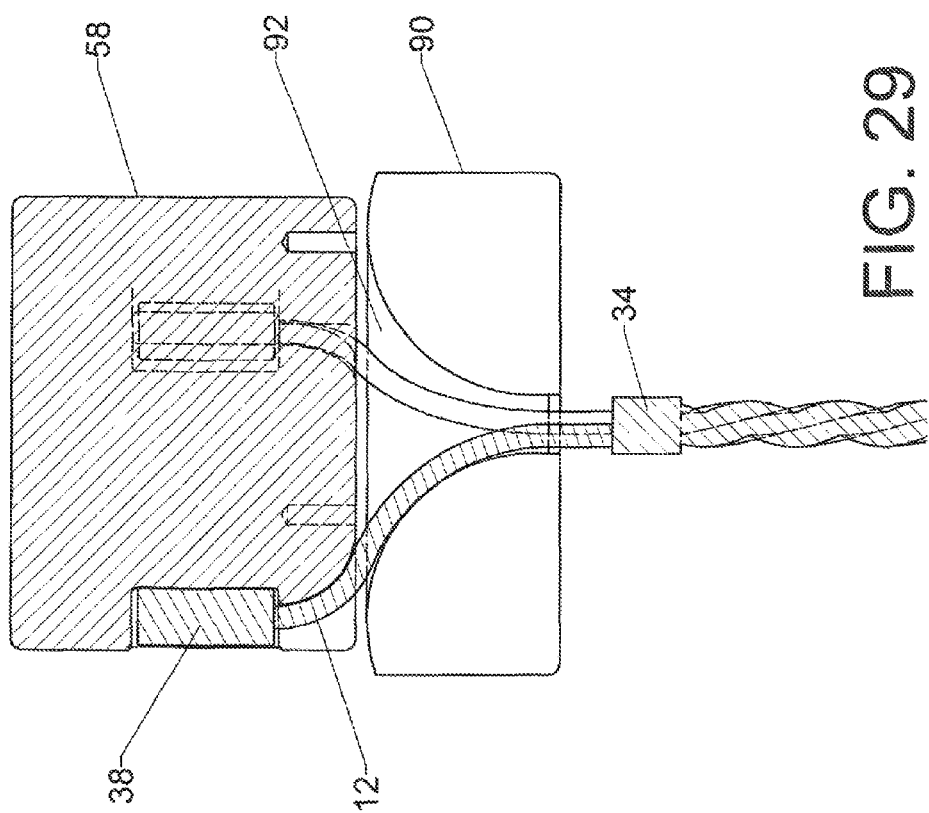
FIG. 29 is a sectioned elevation view, showing an alternate embodiment of the collector.
Figure 30:
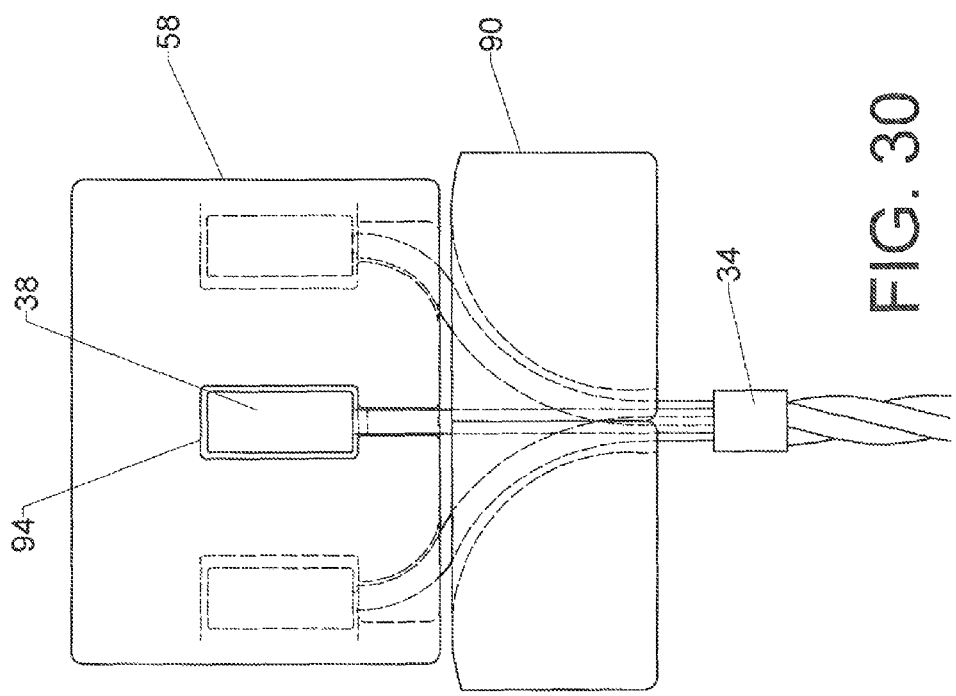
FIG. 30 is an elevation view, showing the embodiment of FIG. 29.
Figure 31:
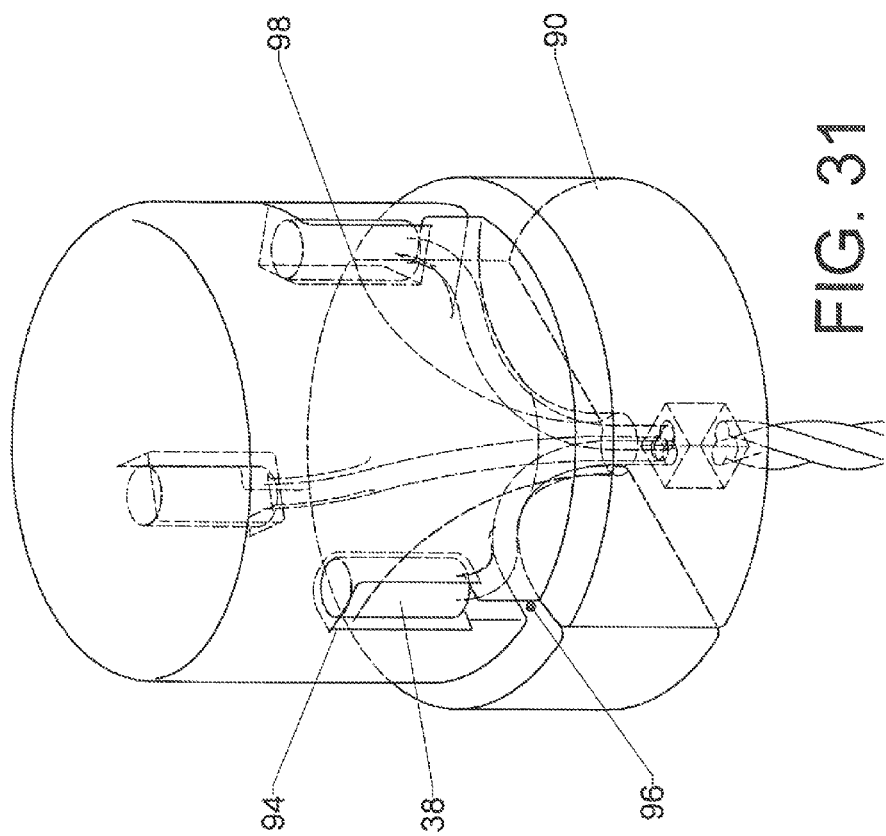
FIG. 31 is a perspective view, showing the embodiment of FIG. 29.

FIGS. 29-31 illustrate another type of collector. FIG. 29 shows a section elevation view. A cable having three strands 12 is placed in a retained binder 34. The free ends of the strands are then placed in potted terminations 38. The potted terminations are then locked into collector 58.

Strand guide 90 assumes a different form in this embodiment. It is simply a collar placed around the cable and provided with a curved passage 92. The curved passage guides the transition of the strands into the collector. The strand guide may or may not be attached to the collector.

FIG. 30 shows another view of the same assembly. Collector 58 includes three cylindrical pockets spaced evenly around its perimeter. A potted termination 38 is pressed into each of these cylindrical pockets 94. FIG. 31 shows the same assembly from still another vantage point. The reader will observe that each cylindrical pocket has an accompanying slot 96 permitting the passage of a strand. Strand guide 90 is preferably made as two halves joined along seam 98 so that it may more easily be attached to the cable.

The reader will thereby understand how the proposed inventive method allows a multi-stranded synthetic cable (having a non-parallel construction) to be broken into individual strands or groups of strands with a termination being placed on each. The multiple terminations are then gathered into a collector. Of course, in some of the disclosed embodiments the function of the individual terminations and the collector are performed by a single element. As an example, in the embodiment of FIG. 16, termination block portion 48 may serve as both a termination and a portion of the collector.

Although the preceding description contains significant detail, it should not be construed as limiting the scope of the invention but rather as providing illustrations of the preferred embodiments of the invention. As one example, although the embodiments discussed in detail have secured the strands into the terminations primarily using potting, a simple mechanical attachment (such as a "spike and cone") could be used to secure the filaments in a particular strand to a particular termination. Thus, the language used in the claims shall define the invention rather than the specific embodiments provided.

Having described my invention, we claim:

1. A method for terminating a cable, said cable including a plurality of strands made of synthetic filaments, at least a portion of which are non-parallel strands, comprising:
    a. straightening a portion of said cable to form a straight portion;
    b. applying a binder to said cable proximate said straight portion;
    c. cutting each of said plurality of strands of said cable within said straight portion so that each of said plurality of strands has a cut end;
    d. securing a plurality of terminations to said cut ends; and
    e. gathering each of said terminations into a collector.

2. A method for terminating a cable as recited in claim 1, further comprising installing a retained binder on said cable so that a length of said cable remains between said retained binder and said cut ends of said strands.

3. A method for terminating a cable as recited in claim 1, wherein:
    a. one of said terminations on said cut ends of said strands is a cast sphere; and
    b. said collector includes a spherical socket sized to receive said sphere.

4. A method for terminating a cable as recited in claim 1, wherein said collector includes multiple portions which are configured to be fastened together into a unified whole.

5. A method for terminating a cable as recited in claim 1, wherein:
    a. said cable includes inner strands and outer strands;
    b. said collector includes a center block and an outer ring;
    c. said terminations on said inner strands are connected to said center block; and
    d. said terminations on said outer strands are connected to said outer ring.

6. A method for terminating a cable as recited in claim 5, wherein said outer ring is connected to said center block by a rotation limiting connection.

7. A method for terminating a cable as recited in claim 5, wherein said connection between said terminations on said outer strands and said outer ring is length-adjustable so that the tension in each of said outer strands can be adjusted.

8. A method for terminating a cable, said cable including a plurality of strands made of synthetic filaments, at least a portion of which are non-parallel strands, comprising:
    a. drawing a length of cable straight;
    b. applying a first binder and a second binder to said straight length of cable;
    c. cutting each of said plurality of strands of said cable within said straight portion so that each of said plurality of strands has a cut end;
    d. applying a plurality of terminations to said cut ends; and
    e. gathering each of said terminations into a collector whereby tensile loads carried by each of said plurality of strands are transferred to said collector.

9. A method for terminating a cable as recited in claim 8, further comprising installing a retained binder on said cable so that a length of said cable remains between said retained binder and said cut ends of said strands.

10. A method for terminating a cable as recited in claim 8, wherein:
    a. one of said terminations on said cut ends of said strands is a cast sphere; and
    b. said collector includes a spherical socket sized to receive said sphere.

11. A method for terminating a cable as recited in claim 8, wherein said collector includes multiple portions which are configured to be fastened together into a unified whole.

12. A method for terminating a cable as recited in claim 8, wherein:
    a. said cable includes inner strands and outer strands;
    b. said collector includes a center block and an outer ring;
    c. said terminations on said inner strands are connected to said center block; and
    d. said terminations on said outer strands are connected to said outer ring.

13. A method for terminating a cable as recited in claim 12, wherein said outer ring is connected to said center block by a rotation limiting connection.

14. A method for terminating a cable as recited in claim 12, wherein said connection between said terminations on said outer strands and said outer ring is length-adjustable so that the tension in each of said outer strands can be adjusted.

15. A method for terminating a cable, said cable including a plurality of strands made of synthetic filaments, at least a portion of which are non-parallel strands, comprising:
   a. straightening a portion of said cable to form a straight portion;
   b. cutting each of said plurality of strands of said cable within said straight portion so that each of said plurality of strands has a cut end;
   c. securing each of said cut ends within terminations; and
   d. gathering each of said terminations into a collector, said collector including a central area and a peripheral area, with a first portion of said terminations being attached to said central area and a second portion of said terminations being attached to said peripheral area.

16. A method for terminating a cable as recited in claim 15, further comprising installing a retained binder on said cable so that a length of said cable remains between said retained binder and said cut ends of said strands.

17. A method for terminating a cable as recited in claim 15, wherein:
   a. one of said terminations on said cut ends of said strands is a cast sphere; and
   b. said collector includes a spherical socket sized to receive said sphere.

18. A method for terminating a cable as recited in claim 15, wherein said collector includes multiple portions which are configured to be fastened together into a unified whole.

19. A method for terminating a cable as recited in claim 15, wherein said peripheral area of said collector is connected to said central area by a rotation limiting connection.

20. A method for terminating a cable as recited in claim 15, wherein said connection between said second portion of said terminations and said peripheral area is length-adjustable so that the tension in each of said outer strands can be adjusted.

* * * * *